Sept. 5, 1939.　　H. J. CUNNINGHAM ET AL　　2,171,542
TELEGRAPH SYSTEM
Filed Aug. 17, 1937　　8 Sheets-Sheet 1

| FIG. 3 | FIG. 4 | FIG. 5 | FIG. 6 | FIG. 7 | FIG. 8 | FIG. 9 |

INVENTORS　H.J. CUNNINGHAM
L. R. DOUGLASS
J. A. DUNCAN
C. R. WALKER

BY William R. [signature]
ATTORNEY

Sept. 5, 1939.    H. J. CUNNINGHAM ET AL    2,171,542
TELEGRAPH SYSTEM
Filed Aug. 17, 1937    8 Sheets-Sheet 3

FIG. 4

INVENTORS
H. J. CUNNINGHAM
L. R. DOUGLASS
J. A. DUNCAN
C. R. WALKER

BY William P. Ballard
ATTORNEY

Sept. 5, 1939.   H. J. CUNNINGHAM ET AL   2,171,542
TELEGRAPH SYSTEM
Filed Aug. 17, 1937   8 Sheets-Sheet 8

FIG. 9

INVENTORS  H. J. CUNNINGHAM
L. R. DOUGLASS
J. A. DUNCAN
C. R. WALKER

BY William P. Ballard
ATTORNEY

Patented Sept. 5, 1939

2,171,542

UNITED STATES PATENT OFFICE 2,171,542

TELEGRAPH SYSTEM

Harold Jerome Cunningham, Scotch Plains, Lloyd Richmond Douglass, Verona, James Archibald Duncan, Ridgewood, and Charles Robert Walker, Jersey City, N. J., assignors to American Telephone and Telegraph Company, a corporation of New York Application August 17, 1937, Serial No. 159,592

10 Claims. (Cl. 178—53.1)

This invention relates to a telegraph system and more particularly to a concentrating arrangement for enabling a plurality of subscribers to transmit over a single main line to an associated subscriber's station.

In previous telegraph systems a definite or fixed portion of a given communication channel, usually an entire telegraph channel, is assigned to a pair of telegraph stations for communication between them in each direction.

In accordance with the present invention, the main line is automatically assigned in rotation to only those stations which desire to transmit messages to their associated stations.

One of the objects of this invention is to increase the efficiency of the main line by suppressing the start and stop impulses and transmitting over the main line only the intelligence conveying impulses plus selecting impulses for directing the intelligence impulses to the proper station at the distant end of the main line.

Another object of this invention is to provide an arrangement for automatically assigning the main line in rotation to only the subscribers' lines which desire to transmit information to their associated distant station.

Still another object of this invention is to control the transmitting apparatus at the subscribers' stations so that the signals will be properly transmitted over the main line.

A further feature of the invention relates to a storing circuit for temporarily storing the impulses at the main station to enable the directing impulses to be added.

Briefly, a preferred embodiment of this invention comprises two main stations connected by a main telegraph channel extending between them. Synchronous telegraph apparatus is connected to each end of the main telegraph channel. A plurality of local telegraph stations are connected to each main telegraph station over a plurality of local telegraph lines. Start-stop telegraph signals are transmitted between the local stations and the main station. At the main station the intelligence conveying signaling impulses are stored for transmission over the main line. In addition, selective impulses are associated with each code combination of intelligence impulses and transmitted over the main line to indicate the local line from which the intelligence impulses were received. At the second main station the selecting impulses direct the intelligence impulses to the proper local station. At the second main station proper start and stop impulses are substituted for the selecting impulses associated with each code combination.

At the first main station an allotting circuit is provided for allotting the next active local line during the transmission of a code combination over the preceding local telegraph line. The transmitting apparatus at the local station of the allotted line is then started or controlled from the synchronous apparatus of the main line so that the impulses will be transmitted over the local line at the proper time for retransmission over the main line.

Each of the local stations is provided with apparatus to energize the line and to indicate that a message is desired to be transmitted to its associated station.

The terms "active" and "energized" are used in this specification to distinguish between local telegraph lines and stations over which it is desired to transmit messages and those local lines which are idle and over which there is desired to transmit no message currents at the time under consideration. These terms, as used in this specification, do not refer to or distinguish between equipped lines in use and spare or unequipped lines or channels.

The foregoing and other objects and features of this invention, the novel features of which are set forth in the claims appended hereto, may be more fully understood from the following description of the following specific embodiment when read with reference to the attached drawings, in which

Fig. 2 shows the manner in which Figs. 3, 4, 5, 6, 7, 8 and 9 are arranged, and

Figure 1:
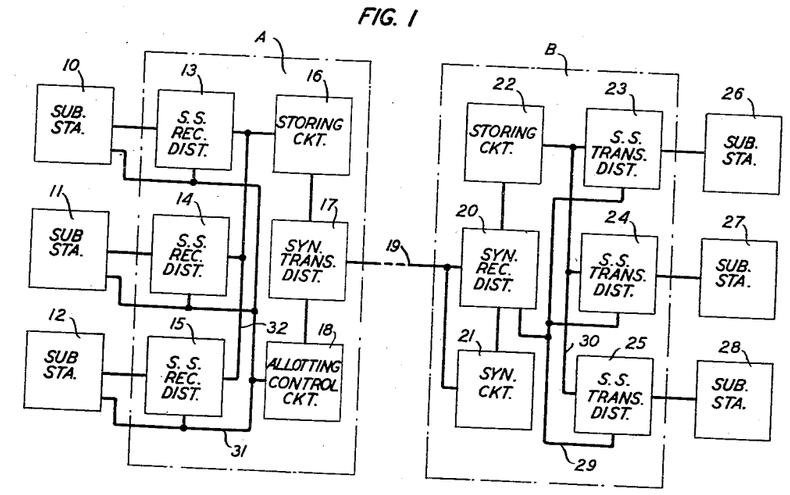
Figure 1 shows, in diagrammatic form, the various elements of the system.

Fig. 1 shows a general outline of a preferred embodiment of this invention. Three subscribers' stations 10, 11 and 12 are shown connected to a main concentrating station A. Subscribers' stations 26, 27 and 28 are connected to a second main concentrating station B.

Normally, in systems of this type, it is desired to furnish a telegraph channel between stations 10 and 26, another independent channel between stations 11 and 27, and a third independent channel between stations 12 and 28 for enabling these pairs of stations to communicate with each other.

As shown in Fig. 1 and as described throughout this application, only one-way communication circuits will be shown and described. It is to be understood, however, that the invention is not limited to systems for transmission of messages in only one direction but is equally well applicable to systems for the transmission of messages in both directions. In case it is desired to provide two-way communication facilities between the respective stations, it is only necessary to provide similar equipment for transmission in the opposite direction.

The specific embodiment of this invention described in this specification provides a concentrating arrangement for three independent telegraph channels. It is to be understood, however, that the invention is not limited to three channels but may be arranged for concentrating the message currents from any suitable number of independent telegraph channels which it is desired to transmit over a single main line.

Each of the subscribers' stations 10, 11 and 12 is provided with a telegraph tape perforator by means of which the subscriber may perforate tape in accordance with the messages to be transmitted. Each of these stations is also provided with a telegraph tape transmitting apparatus and suitable controlling switches. When it is desired to secure copies of the messages transmitted, a receiving printer is also connected to the line at the subscriber's station.

The main stations A and B are connected together by a single main telegraph channel 19. This channel 19 may be of any suitable type of telegraph channel, including an open-wire telegraph line, a full metallic telegraph line or cable circuit, a carrier current telegraph channel, a telegraph channel of a multiplex telegraph line, a radio channel or any combination of these types of lines or channels.

The subscribers' stations 26, 27 and 28 are provided with usual teletypewriter receiving equipment. As pointed out above, in case it is desired to transmit message currents in both directions, the subscribers' stations 26, 27 and 28 will also be provided with perforated tape transmitters and tape perforating apparatus similar to that provided at stations 10, 11 and 12 while receiving equipment will be provided at stations 10, 11 and 12.

At the first main station subscribers' lines from the subscribers' stations 10, 11 and 12 are terminated in start-stop receiving distributor equipments 13, 14 and 15, respectively. This receiving equipment is connected to a storing circuit 16 which stores the intelligence conveying impulses of the received signals for transmission through the synchronous transmitting distributor 17 to the main line 19 extending to the second main station B.

An allotting equipment 18 is also provided at the first main station A and is connected to each of the receiving distributors 13, 14 and 15, as well as the subscribers' stations 10, 11 and 12 and the synchronous transmitting distributor 17.

At the second main station B a receiving synchronous distributor 20 is connected to the main line 19. This receiving distributor is controlled through a synchronizing circuit 21 so that it is maintained in synchronism with the transmitting synchronous distributor 17 at the first main station A. Here, again, the intelligence conveying impulses of the received signals are stored in storing device 22 which is connected to the start-stop transmitting distributor equipments 23, 24 and 25 which in turn are connected to the subscribers' stations 26, 27 and 28, respectively. In addition, a control circuit is connected between the receiving synchronous distributor and the start-stop transmitting distributor equipments 23, 24 and 25 for controlling the transmission of impulses to the subscribers' stations.

The transmission between the subscribers' stations and the main stations is by means of the usual well-known start-stop code combinations of signaling impulses. These start-stop code combinations comprise, first, a start impulse, second, a code combination of five intelligence conveying impulses representing the character or symbol to be transmitted, and a stop impulse. At the main station A the intelligence conveying code combinations of impulses are stored in the storing circuit 16. In addition, the allotting and control circuit 18 is arranged to condition the synchronous transmitting distributor 17 for transmitting over main line 19 directive or selective impulses with each code combination of intelligence conveying impulses to direct these impulses at the second main station B.

In case only one subscriber at any one of the stations 10, 11 or 12 wishes to transmit messages to the associated stations 26, 27 or 28, respectively, the subscriber at that station, say station 10, will operate suitable keys or switches to energize his equipment and to indicate at the first main or concentrating station A that he wishes to transmit to his associated station 26. This conditions the allotting equipment 18 at the first main station so that it will cause the tape transmitting equipment at the subscriber's station 10 to transmit a single code combination of impulses for each revolution of the synchronous transmitting distributor 17. The impulses are received by the start-stop receiving distributor 13 and the intelligence conveying portions are stored in the storing circuit 16. Storing circuit 16 and also the allotting circuit 18 condition the synchronous transmitting distributor 17 so that a directive impulse or impulses indicating that the intelligence impulses originated at station 10 are added to each code combination of the intelligence conveying impulses as it is transmitted over line 19.

As the main station B the synchronous receiving distributor 20 responds to the received impulse and causes the intelligence conveying code combination to be stored in storing circuit 22 and causes the directing or selecting impulses to start transmitting distributor equipment 23. Start-stop transmitting distributor equipment 23 adds a start and a stop impulse to each code combination as it is transmitted to the subscriber's station 26 so the impulses will be properly recorded on the receiving equipment at the subscriber's station 26.

In case two or more of the subscribers wish to simultaneously transmit message currents to their associated stations the main line 19 is assigned in rotation to each of the stations for the transmission of a single code combination so long as the subscribers wish to transmit from their stations to the associated stations.

Assume, for example, that the subscribers at both stations 10 and 11 wish to transmit messages to their associated stations 26 and 27, respectively.

As before, the subscribers at these stations operate suitable keys and switches at their stations to energize their equipment and to indicate to the apparatus at the main station that they wish to transmit signal impulses to their associated stations.

During the first revolution thereafter of the synchronous transmitting distributor 17 the allotting circuit 18 causes this distributor to start the transmitting apparatus at the subscriber's station 10, which then transmits a single code combination to the main station A. During the reception of the signal impulse from station 10 the receiving distributor equipment 13 causes the intelligence conveying code combination of impulses to be stored in storing circuit 16. During this time, distributor equipment 13 also causes the allotting circuit 18 to assign, allot or connect the control circuits of station 11 to the main transmitting distributor so that during its second revolution it will cause the transmitting equipment at station 11 to transmit a single code combination to the main station A.

During the second revolution of the main transmitting distributor 17 the code combination stored in storing circuit 16 is transmitted over line 19 together with selecting impulses indicating that the impulses originated at subscriber's station 10. These impulses are received by the synchronous receiving equipment 20 at station B. The intelligence conveying impulses are stored in storing circuit 22 and the directing or selecting impulses cause the start-stop transmitting distributor equipment 23 to start. Transmitting distributor equipment 23 then transmits the impulses stored in storing circuit 22 to the subscriber's station 26. In transmitting these impulses to the subscriber's station 26, the transmitting distributor equipment 23 adds suitable start and stop impulses to the code combination.

The start-stop receiving distributor equipment 14 responds to the code combination transmitted from station 11 and causes the intelligence conveying impulses thereof to be stored in storing circuit 16. During this time it conditions the allotting circuit 18 so that it will add proper selective impulses to the intelligence conveying code combination impulses and also so that it will connect the control circuit of station 10 to the transmitting distributor 17 during its third revolution.

During the third revolution of the transmitting distributor 17 the intelligence conveying code combination, together with suitable selecting impulses, are transmitted over line 19 to station B. At station B the intelligence impulses are stored in circuit 22 and the start-stop transmitting distributor equipment 24 is started, which in turn repeats the stored impulses to subscriber's station 27.

During this third revolution the transmitting distributor 17 causes the transmitting apparatus at station 10 to transmit a second code combination of impulses to the main station A and the above cycle of operation is repeated and continues so long as both the subscribers at stations 10 and 11 wish to transmit to their associated stations.

When the transmission from either one of the subscribers' stations is completed the subscriber at that station operates suitable switches and apparatus to deenergize his equipment and indicate to the central exchange that no further messages are available for transmission to the associated station. This is also true in case the subscriber at either one of the stations fails to perforate the tape as fast as it is transmitted or as soon as the supply of perforated tape at that station is exhausted. When this occurs the operation of the system will be as described above when only one subscriber's station is transmitting impulses to its associated station.

In case all three subscribers wish to simultaneously transmit messages to their associated stations the operation of the system will be substantially as described above except that under these conditions a code combination will be transmitted first from station 10, then a code combination from station 11, and then the third code combination transmitted over line 19 will be from station 12. The fourth, fifth and sixth code combinations transmitted over line 19 will be transmitted from stations 10, 11 and 12, respectively. Thus, during the time a single station is transmitting the entire line time of channel 19 is assigned to that station. During the time two of the stations desire to simultaneously transmit the line time of channel 19 is assigned to these stations in rotation. Similarly, during the time impulses are transmitted from all three stations simultaneously, the line time of channel 19 is assigned to each of these stations in rotation for transmitting a code combination of impulses from each one of the stations in rotation. At the receiving end the code combinations of impulses are directed to the proper stations by means of selecting impulses added to the code combinations transmitted from the first main station.

It is to be noted that the allotting circuit causes idle lines to be skipped and allots only the active lines over which it is desired to transmit message currents.

Figure 2:
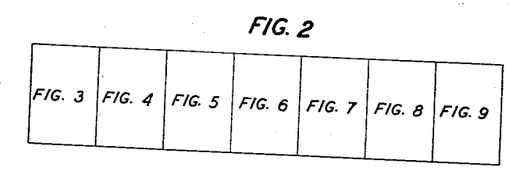

Figs. 3 to 9, when arranged as shown in Fig. 2, show the details of a preferred embodiment of this invention.

Figure 3:
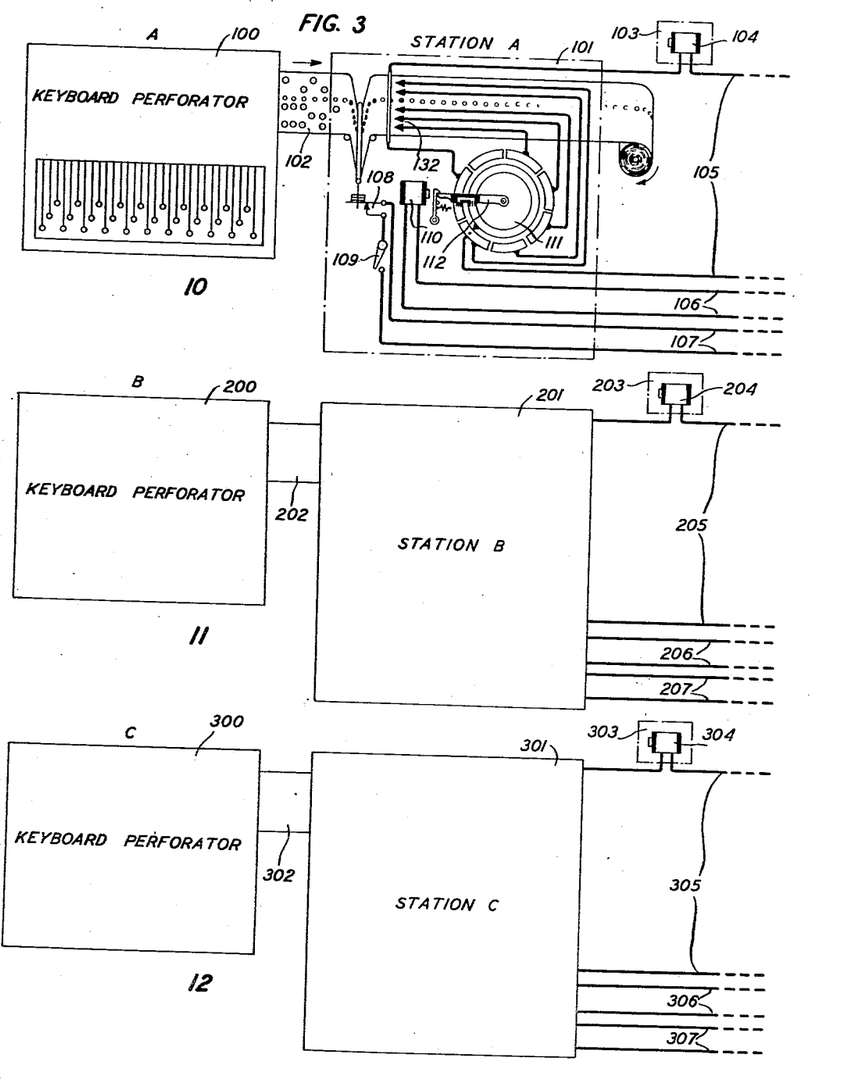
Figs. 3, 4, 5, 6, 7, 8 and 9 illustrate the details of a preferred embodiment of this invention.

Fig. 3 shows the apparatus located at subscribers' stations 10, 11 and 12.

Figure 6:
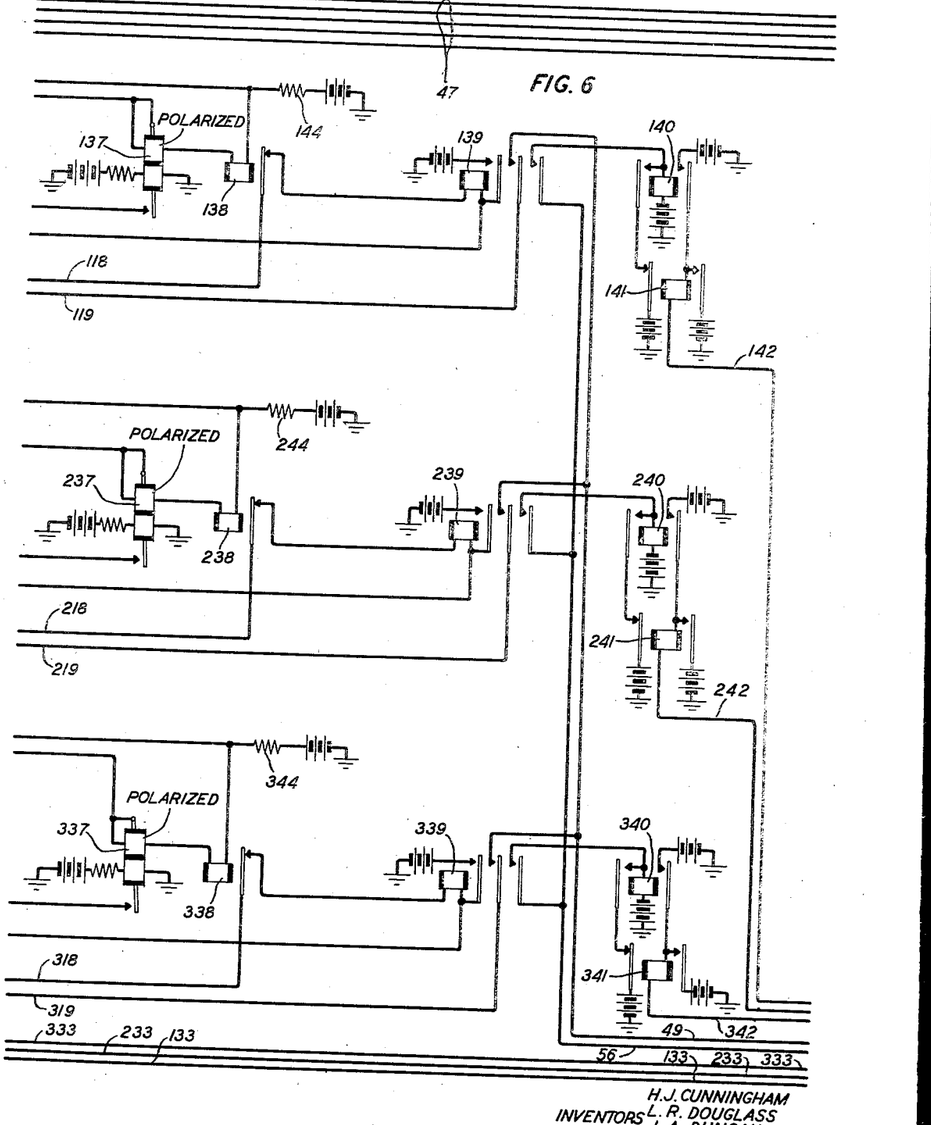
Figure 7:
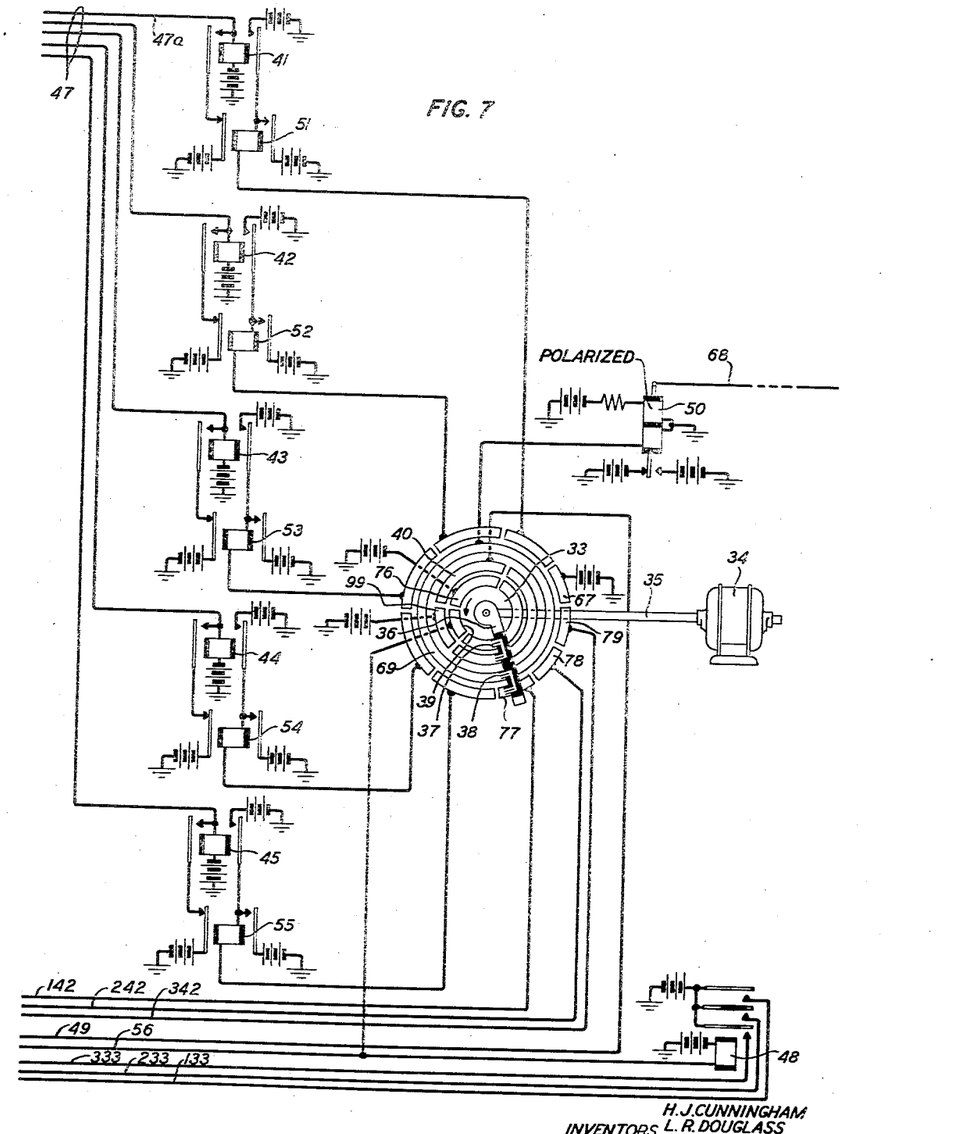
Figure 8:
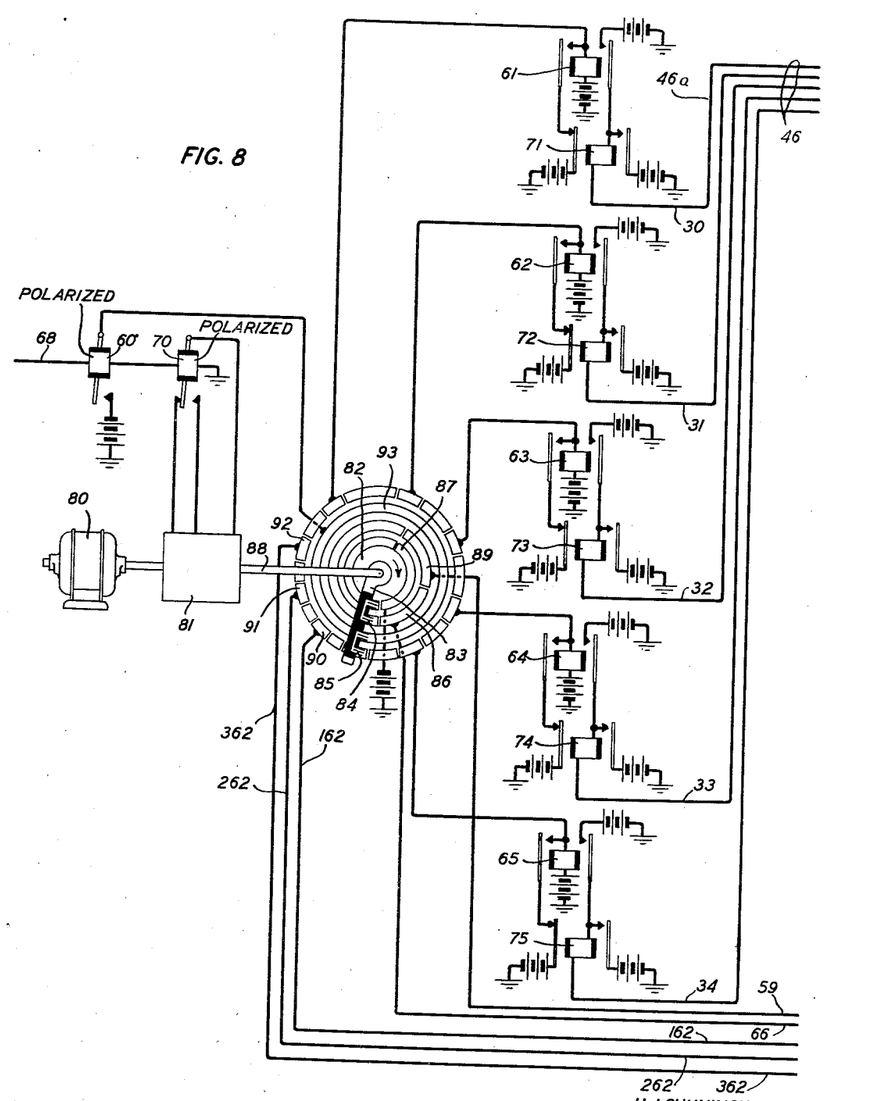
Figure 9:
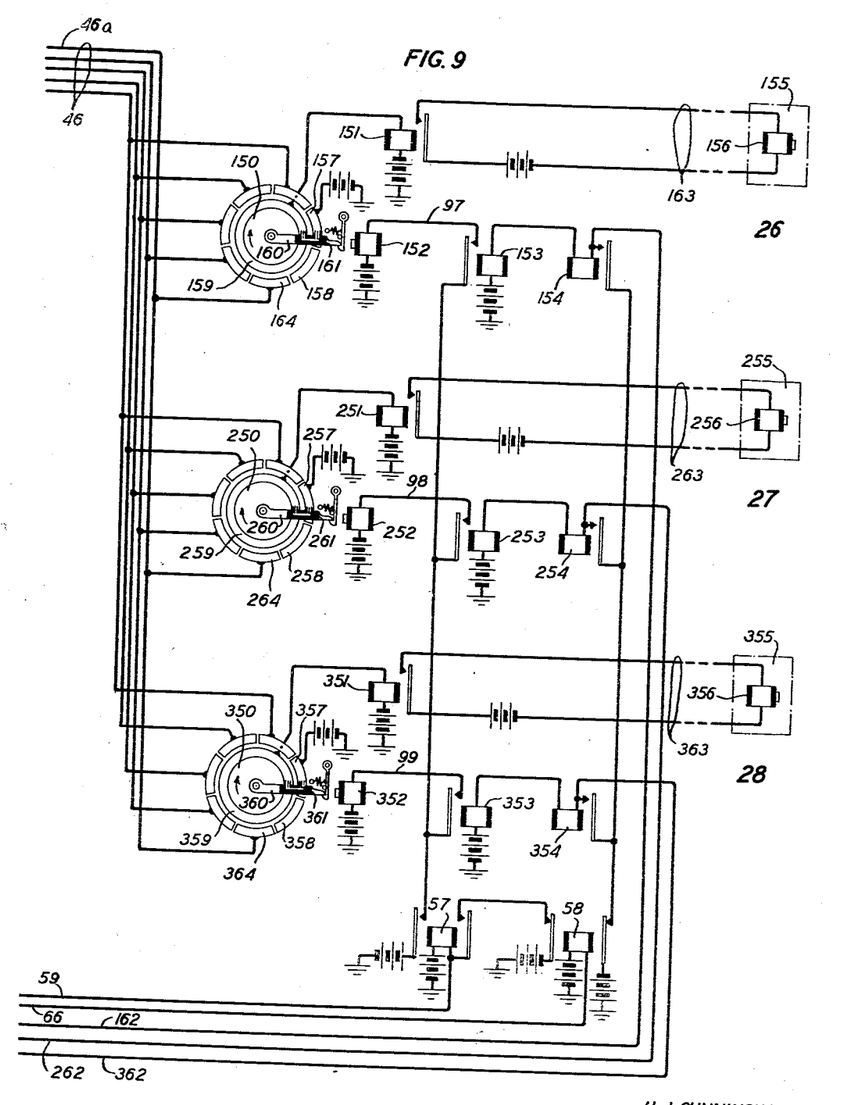

Figs. 4, 5, 6 and 7 show the transmitting apparatus located at the first main concentrating station A, and Figs. 8 and 9 show the circuits in detail at the second main station B and also at the subscribers' stations 26, 27 and 28.

The apparatus at each of the subscribers' stations is substantially the same, so that it is only necessary to describe the apparatus at one of the stations in detail, it being understood that similar apparatus is provided at the other stations.

Any suitable tape perforator 100 is provided at the subscriber's station for perforating the tape 102 in accordance with the signals to be transmitted. This perforator may be of any suitable well known type for perforating tape in accordance with signal impulses to be transmitted. Details of such perforating apparatus are described in U. S. Patents 1,161,500 granted November 23, 1915, to B. F. Merritt, and 1,432,978 granted October 24, 1922, to A. D. Dowd.

From the perforating apparatus the tape passes to a tape transmitting apparatus 101. This tape transmitting apparatus is similar to that described in detail in U. S. Patents 1,965,572 granted to C. W. Burkey et al. on July 10, 1934; 1,969,891 granted August 14, 1934, to R. A. Lake et al.; 2,019,505 granted to A. H. Riber on November 5, 1935; and 2,055,567 granted September 29, 1936, to E. F. Watson. In addition, teletypewriter receiving apparatus 103, including the printing magnet 104, is also furnished at the subscriber's station when required, or desired, in order to record a copy of the signals actually transmitted from the subscriber's station.

Similar perforating, transmitting and recording apparatus 200, 201 and 203 and 300, 301 and 303 are provided at stations 11 and 12, respectively.

Figure 4:
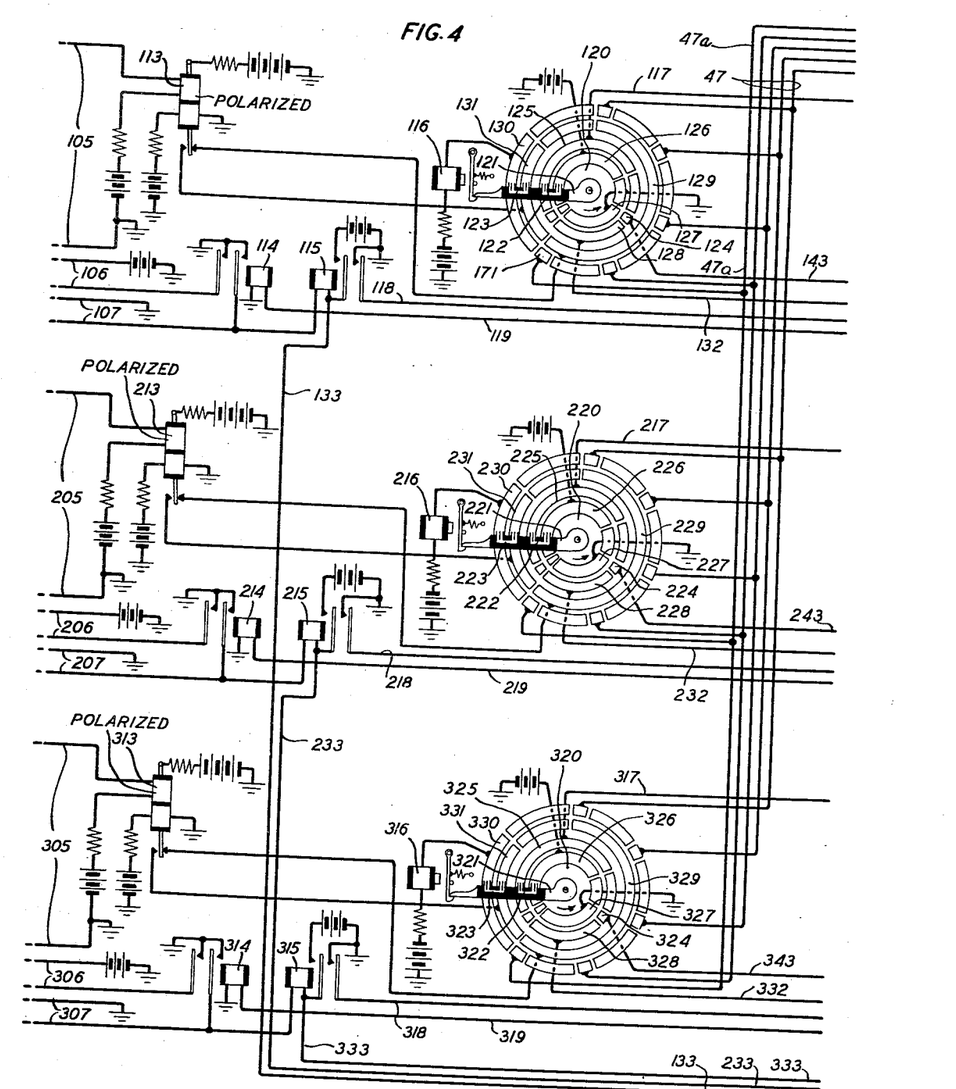
Figure 5:
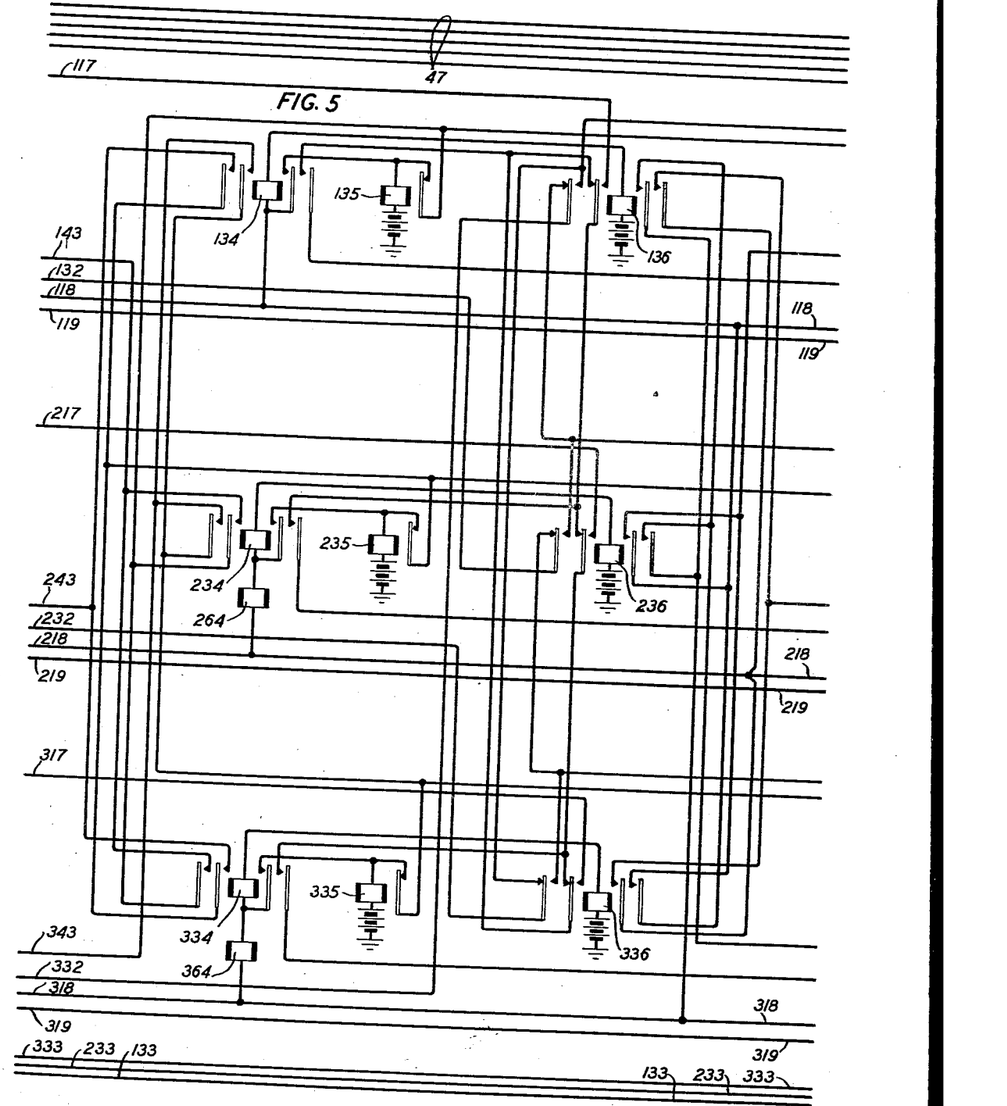

Fig. 4 shows the start-stop distributors 120, 220 and 320 which are associated with their respective stations 10, 11 and 12. Fig. 4 also shows relay equipment individual to each of the distributors. Figs. 5 and 6 show the circuit arrangements of the allotting and controlling device for controlling the operation of the apparatus at the subscribers' stations. Fig. 7 shows the main distributor 33 which is connected to the main line 68. Fig. 7 also shows storing relays for storing the intelligence signal impulses transmitted from the subscribers' stations.

As pointed out above, the main line 68 may be of any suitable type, including grounded telegraph lines, full metallic telegraph lines, carrier current channels, radio channels, multiplex telegraph channels or any combination of these types of communication channels. A simple grounded telegraph line is shown in order to simplify the understanding of this invention. These line circuits, consequently, will not be described in detail here because they are well known in the art and operate in their usual manner.

Figs. 8 and 9 show the main line synchronous receiving distributors, storing relays, and the transmitting start-stop distributors located at the second main station, as well as the apparatus located at the subscribers' stations 26, 27 and 28.

*Only one subscriber transmitting*

For example, assume that station 10 wishes to transmit to its associated station 26.

When the subscriber at station 10 wishes to transmit he will operate suitable switches for applying power to the perforator and tape transmitter 101. Details of the motor and power supply circuits have not been shown because they are well known and understood by those familiar with apparatus of this type. Associated with one of these keys, or by means of a separate key, contacts 109 are closed. Then when a sufficient supply of tape 102 is perforated contacts 108 will close and complete the circuit of loop 107. This prepares a circuit for operating relay 115 the next time the main transmitting distributor connects battery to the control segment 39. When the main transmitting distributor 33 connects positive battery to the control segment 39 a circuit is completed for the operation of relay 48 from positive battery, segment 99, brush 37 and control segment 39 of the main transmitting distributor through the winding of relay 48 to negative battery. Relay 48 in operating completes a circuit for the operation of the subscribers' control relay 115 in a circuit from positive battery through the operated contacts of relay 48, lead 133, the winding of relay 115, loop 107, switch 109, contacts 108 to ground over loop 107. Relay 115 in operating completes a locking circuit through its inner left-hand operated contacts and winding to ground over loop 107 and the closed contacts 108 and 109.

Relay 115 in operating connects ground to lead 118 which completes a circuit for the operation of relays 134 and 136 from ground through the outer operated contacts of relay 115, lead 118 and through the windings of relays 134 and 136 to battery. The operation of relay 134 completes a circuit for the operation of relay 135 from ground connected to lead 118 through the right-hand operated contacts of relay 115, the right-hand inner make contacts of relay 134 to battery through the winding of relay 135.

Relay 134 in operating also completes a circuit for the operation of relays 137 and 138 from ground through the same inner right-hand operated contacts of relay 134, the break contacts of relay 135 and the windings of relays 137 and 138 to battery through resistance 144. Relay 135 is made slow-operating to permit relays 137 and 138 to operate before relay 135 operates and interrupts the operating circuit of these relays 137 and 138. When relay 135 operates, relays 137 and 138 release because their locking circuit through the contacts of relays 236 and 336 is open at this time.

Relays 137, 237 and 337 are provided with a lower or biasing winding and circuits in addition to the upper or operating winding. Current flowing through the lower winding tends to release the relay and make it fast in releasing while current flowing through the upper or operating winding overcomes the effect of the biasing winding and causes the relays to operate.

The operation of relay 115 also completes a circuit for the operation of relay 139 from ground through its right-hand operated contacts, lead 118 and break contacts of relay 138 through the winding of relay 139, the right-hand operated contacts of relay 134, the inner left-hand break contacts of relay 336, the inner left-hand break contacts of relay 236, inner left-hand make contacts of relay 136 to battery through the start segment 125, brush 122 and segment 126 of the start-stop receiving distributor 120. Relay 139 in operating completes a locking circuit from battery through its innermost make contacts, winding of relay 139 to ground through the break contacts of relay 138 and the make contacts of relay 115.

Then when the main transmitting distributor 33 connects battery to segment 40 a circuit is completed for the operation of the start relay 114 from battery through segment 76, brush 37 and segment 40 of the main transmitting distributor, lead 49, the operated contacts of relay 139, lead 119 to ground through the winding of relay 114.

The operation of relay 114 completes a holding circuit for relay 115 through its right-hand operated contacts, winding of relay 115 to battery through the left-hand operated contacts of relay 115.

Relay 114 in operating also completes a circuit for the operation of the start magnet 110 of the distributor 111 at the subscriber's station from ground through the operated contacts of relay 114, lead 106 through the winding of the start magnet 110, and lead 106 to battery.

The operation of the start magnet 110 releases the brush arm 112 for one revolution which is then driven by the driving motor of the transmitting distributor equipment 101 through a friction clutch. The motor, friction clutch, and related apparatus of the transmitting distributor 101 have not been shown because they are well understood by persons familiar with apparatus of this type and operate in their usual manner.

During the revolution of brush arm 112 the distributor 111 transmits a start-stop code combination of impulses over line 107 in accordance with the perforations in tape 102 under the tape control contacts 132. The first impulse of the code combination comprises a start impulse. This is followed by a code combination of five intelligence conveying impulses which in turn are followed by a stop impulse.

At the central station relay 113 follows the impulses transmitted over line 105. The current flowing in the upper winding of relay 113 and line 105 is sufficient to cause the relay 113 to operate to close its right-hand contacts. Current flowing through the lower or biasing winding of relay 113 in an obvious circuit tends to operate relay 113 to its left-hand position and close its left-hand contacts. However, the current flowing through this winding is overpowered by the current flowing through the upper winding so that the relay is operated to its right-hand position by current flowing through line 105 and the upper winding of relay 113. When the line current flowing through the upper winding is interrupted, current flowing through the lower winding of relay 113 causes the relay to operate to its left-hand position.

When the start impulse is received by relay 113, relay 113 will be operated to its left-hand position and complete a circuit for the operation of the start magnet 116 from negative battery through the winding of start magnet 116, segment 130, brush 123 and segment 131 of distributor 120 to positive battery through the left-hand contacts of relay 113. Start magnet 116 in operating releases brush arm 121 of the distributor 120. Brush arm 121 then rotates through a revolution substantially in synchronism with the brush arm 112 of the distributor 111 at the subscriber's station. During the rotation of brush arm 121 the marking or right-hand contact of relay 113 is connected in succession to five pairs of storing relays 41 to 45 and 51 to 55 over leads 47. If the first impulse of the code combination, that is, the first of the intelligence conveying impulses, is a marking impulse, marking current received over line 105 causes relay 113 to be operated to its right-hand position where it completes a circuit for the operation of relay 41 over a circuit from battery through the winding of relay 41, lead 47a, segment 171, brush 123, segment 129 to battery through the right-hand marking contacts of relay 113. Relay 41 in operating completes a locking circuit from negative battery through its winding and left-hand contacts to positive battery through the left hand contacts of relay 51.

If the No. 1 impulse of the code combination had been spacing, relay 113 would be operated to its spacing contacts when brush 123 connected lead 47a to the marking contact of relay 113. Consequently, relay 41 would not be operated.

In a similar manner relays 42 to 45 are operated by marking impulses received during second, third, fourth and fifth impulse periods of the code combination. These relays are not operated but remain released if the impulses received during the corresponding periods are spacing.

During the revolution of the brush arm 36 of the main synchronous transmitting distributor 33 following the closure of the start segment 40, referred to above, brush 37 will again connect battery to the control segment 39 and cause the operation of relay 48 as described above. When battery is connected to segment 39 at this time a circuit is completed for the operation of relay 140 from negative battery through the winding of relay 140, right-hand operated contacts of relay 139, lead 56 to positive battery through segment 39, brush 37 and segment 99 of the distributor 33. The operation of relay 140 completes a locking circuit from negative battery through its winding and left-hand operated contact to positive battery through the left-hand contacts of relay 141.

As brush arm 36 continues its revolution brush 38 connects segment 77 and segment 69 together. This completes a circuit for the transmission of a marking, directing or selecting impulse over line 68 through relay 50. The circuit for the operation of relay 50 for the transmission of this impulse is from ground through the lower winding of relay 50, segment 69, brush 38, segment 77 of distributor 33, lead 142 to battery through the winding of relay 141 and the right-hand operated contacts of relay 140. When relay 141 is operated by current flowing in this circuit it closes a locking circuit from battery through its right-hand contacts and winding to segment 77 over lead 142. Relay 141 in operating interrupts the locking circuit for relay 140 and permits it to release. As brush 38 passes off of segment 77 it interrupts the locking circuit of relay 141 and permits this relay to release.

However, during the time brush 38 is passing over segment 77, the circuit through the lower winding of relay 50 is maintained as described above, so that relay 50 will be held on its marking contact during this time. When brush 38 passes off segment 77 a circuit through the lower winding of relay 50 is interrupted, permitting the upper winding of relay 50 to operate it to its spacing position and transmit spacing impulses over line 68 during the time brush 38 is passing over segments 78 and 79 because relays 240 and 340 are not operated at this time to close the circuit through the lower winding of relay 50.

At the second central station the signals received from line 68 actuate the receiving relay 60 and also a synchronizing relay 70. Synchronizing relay 70 cooperates with the synchronizing apparatus 81 to maintain the receiving brush arm 83 of receiving distributor 82 in synchronism with the brush arm 36 of the transmitting distributor 33. Synchronizing relay 70 and apparatus 81 may be of any suitable type. Details of suitable synchronizing apparatus are described in detail in U. S. Patents 1,747,248 granted to W. A. Knoop on February 18, 1930; 1,848,180 granted to W. A. Knoop on March 8, 1932; 1,832,309, November 17, 1931, which was reissued as Reissue 19,067 on January 30, 1934.

A synchronizing segment 67 is provided on the transmitting distributor 33. This segment is arranged to transmit a marking signal or impulse over line 68 through sending relay 50 during each revolution of the brush arm 36. By so transmitting a marking synchronizing impulse each revolution of brush arm 36, the synchronizing apparatus 81 will be able to maintain the receiving distributor brush arm 83 in synchronism with the transmitting brush arm 36 during the time when no signal impulses are being transmitted over line 68. It is to be understood that any other suitable arrangement might be employed for sending reversals during idle periods without departing from the scope of this invention. For example, certain of the intelligence conveying impulses might be inverted, or the selecting or directing impulses might be reversed from the intelligence conveying impulses, the essential requirement being that at least one change of the line condition be transmitted to the second station during each revolution of the transmitting distributor.

Received impulses are distributed by receiving distributor 82 to control suitable storing and directing relays. The directing or selecting impulses transmitted by segments 77, 78 and 79 of the transmitting distributor are distributed to segments 90, 91 and 92 of the receiving distributor 82 and control directing relays, as will be described. The code combinations of the five intelligence conveying impulses are distributed to the storing relays 61 to 65 and 71 to 75. Relays 61 to 65 are operated by marking impulses received during the respective impulse intervals of the code combination. These relays remain non-operated if spacing impulses are received at the time brush 85 connects them to the contacts of the receiving relay 60.

When the received impulses originate at station 10, as assumed above, the first selecting impulse will be a marking impulse. During the time brush 85 is passing over segment 90 a marking impulse is received over line 68. Under these conditions, a circuit is completed for the operation of relays 153 and 154 from positive battery through the windings of relays 153 and 154, lead 162, segment 90, brush 85, segment 93 to negative battery through the contacts of receiving relay 60.

Relay 154 in operating completes a locking circuit from negative battery through the break contacts of relay 58, the make contacts of relay 154 to positive battery through the windings of relays 154 and 153. Relay 153 in operating prepares a circuit for the operation of the start magnet 152 under control of the receiving distributor 82. When brush arm 83 carries brush 84 in contact with the start segment 89 a circuit is completed for the operation of relay 57 from negative battery through segment 87, brush 84, segment 89, lead 59, winding of relay 57 to positive battery.

The operation of relay 57 completes a locking circuit from negative battery through the break contacts of relay 58, the make contacts of relay 57 to positive battery through the winding of relay 57.

Relay 57 also completes a circuit for the operation of the start magnet 152 from positive battery through the operated contacts of relays 57 and 153 to negative battery through the winding of start magnet 152.

The operation of start magnet 152 releases brush arm 160 of the start-stop transmitting distributor 150. Brush 161 in passing over segment 158 transmits a start impulse to station 26 over line 163 through the repeating relay 151. The teletypewriter equipment 155 which is actuated by the receiving magnet 156 responds in the usual manner to this start impulse.

As brush 161 then passes over the next five segments it transmits the impulses stored on relays 61 to 65 to station 26.

Assume for example that the No. 1 impulse of the code combination of intelligence conveying impulses was a marking impulse. Under this condition relay 61 was operated as brush 85 passed over the first segment of receiving distributor 82 assigned to the code combination of intelligence conveying impulses.

Then when brush 161 passes over segment 164 of distributor 150 a circuit is completed for the operation of relay 151 from positive battery through the right-hand operated contacts of relay 61, winding of relay 71, lead 46a, segment 164 of distributor 150, brush 161, segment 159 to negative battery through the winding of relay 151. Relay 151 in operating transmits a marking signal over line 163 to the subscriber's station 26.

Relay 71 also operates in the above-described circuit and completes a locking circuit from battery through its own right hand contacts and winding, lead 46a, segment 164, brush 161 and ring 159 of the transmitting distributor 150 to negative battery through the winding of relay 151. Relay 71 in operating interrupts the locking circuit for relay 61 through its left-hand contacts and permits this relay to release. As brush 161 passes off of segment 164 it interrupts the locking circuit of relay 71 and permits this relay to release.

If the first impulse had been spacing, relay 61 would not have been operated. Consequently, during the time brush 161 passes over segment 164 the circuit for operating relay 151 would be incomplete, allowing this relay to release and transmit a spacing signal over line 163 to the receiving magnet 156 of teletypewriter 155 at the subscriber's station 26.

In a similar manner, the impulses stored on relays 62, 65 are transmitted to station 26 to control the telegraph receiving or recording apparatus.

After brush 84 passes off of segment 89 and on to segment 86 it completes a circuit for the operation of relay 58 from negative battery through segment 87, brush 84, segment 86 of the receiving synchronous distributor 82, lead 66 to positive battery through the winding of relay 58. Relay 58 in operating interrupts the locking circuit for relays 153, 154 and 57 and allows these relays to release. Release of relays 153 and 57 interrupts the operating circuit for the start magnet 152 which in turn releases and stops brush arm 160 after it has completed the revolution.

Just before brush arm 160 comes to rest brush 161 completes a circuit from positive battery through segment 157, brush 161, segment 159 to negative battery through the winding of relay 151 for transmitting a stop impulse to the teletypewriter apparatus at station 26.

During each succeeding code combination of impulses transmitted from station 10 the foregoing cycle of operations is repeated.

When transmission from station 10 is complete or the supply of perforated tape 102 becomes exhausted either contacts 109 or contacts 108 are opened. This interrupts a circuit of relay 115 and causes this relay to release. The release of relay 115 permits relays 134, 135, 136 and 139 to release and restore the circuit to its normal condition.

Two or more stations transmitting

During the time more than one station wishes to simultaneously transmit messages to its corresponding or associated station the operation of the circuits is quite similar to that described above except that under this condition a code combination of impulses is transmitted from one station, then a code combination from the next station, the third combination transmitted over the main line will be from the next station, and so on until a code combination is transmitted from each of the stations desiring to simultaneously transmit messages to their corresponding stations. The next code combination will then again be transmitted from the first station, after which a code combination will be transmitted from each of the other stations in rotation.

Assume, for example, that it is desired to simultaneously transmit signal impulses from stations 10 and 11. If either of the stations, say station 10, is transmitting impulses at the time the second station, station 11, desires to transmit impulses, the operation of the circuits for transmitting the impulses from station 10 prior to the transmission from station 11 will be as described above.

When the second station, station 11, desires to transmit impulses, the operator or subscriber thereat will actuate the appropriate keys and switches which will prepare a circuit for the operation of relay 215. Relay 215, however, is not operated until brush 37 passes over control segment 39. However, prior to passing over segment 39, brush 37 passes over start segment 40 which causes the operation of relay 114. This in turn causes another group of impulses representing a character to be transmitted from station 10 in addition to the group being transmitted from station 10 when the operator at station 11 actuates the appropriate keys and switches to initiate transmission from station 11.

During the transmission of this final group of impulses from station 10, relay 215 is operated when brush 37 passes over segment 39. At this time a circuit is completed from positive battery through segment 99, brush 37, segment 39 to negative battery through the winding of relay 48. Relay 48 in operating completes a circuit for the operation of relay 215 from battery through its contacts, lead 233, winding of relay 215 to ground over loop 207 and through the operated supervisory keys and switches at station 11.

Relay 215 in operating completes a locking circuit whereby it is locked operated to the ground over loop 207. Relay 215 in operating also completes a circuit for operating relays 234 and 236. Relay 234 in operating completes a circuit for the operation of relays 235, 237 and 238. Relay 235 is slow in operating so that relay 237 will have sufficient time to operate and lock before relay 235 opens the operating circuit. Relay 237 in operating completes a locking circuit for relays 237 and 238 from ground through the right-hand contacts of relay 215, lead 218, right-hand operated contacts of relay 136, contacts of relay 237 to battery through the windings of relays 237 and 238 and resistance 244.

At about this time brush arm 121 of the start-stop distributor 120 carries brush 122 in contact with segment 128 and completes a circuit for releasing relays 237 and 238 from ground through segment 127, brush 122, segment 128 of distributor 120, lead 132, operated left-hand contacts of relay 236 to the right-hand winding terminal of relay 238 causing relays 237 and 238 to release because ground is now connected to both ends of the circuit including their windings.

As brush arm 121 continues to rotate during the transmission of the final code combination from station 10, brush 122 passes over segment 124 and completes a circuit for the operation of relays 137 and 138. This circuit may be traced from ground through segment 127, brush 122, segment 124, lead 143, operated inner left-hand contacts of relay 234 to battery through the windings of relays 137 and 138 and resistance 144. Relay 137 in operating completes a locking circuit for locking relays 137 and 138 operated from ground through the right-hand operated contacts of relay 115, lead 118, inner right-hand contacts of relay 236, operated contacts of relay 137 to battery through the upper winding of relay 137, the winding of relay 138 and resistance 144. Relay 138 in operating interrupts the locking circuit of relay 139 which in turn releases.

As brush arm 121 nears the end of the revolution, brush 122 passes over segment 125, and completes a circuit for the operation of relay 239 from battery through segment 126, brush 122, segment 125, lead 117, operated inner left-hand contacts of relay 136, operated right-hand outer contacts of relay 234, winding of relay 239, break contacts of relay 238 to ground over lead 218 through the operated right-hand contacts of relay 215.

Then as brush arm 36 again carries brush 37 over start segment 40, a circuit is now completed for the operation of relay 214 from battery through segment 76, brush 37, segment 40, lead 49, operated contacts of relay 239, lead 219 to ground through the winding of relay 214. Relay 214 in operating completes a circuit over loop 206 to station 11 for causing a group of impulses representing a character to be transmitted from station 11.

When brush arm 121 completes the revolution it will be stopped by the armature of stop magnet 116 because the start relay 114 is not operated at this time to cause the transmitting equipment 101 at station 10 to transmit another code combination. Consequently, this equipment will remain at rest during the transmission of the code combination from station 11.

The code combination transmitted from station 11 will be transmitted through the receiving distributor 220 to the storing relays 41 to 45 in a manner similar to that described above for impulses transmitted from station 10. In this case, however, relay 240 will be operated instead of relay 140; consequently, a marking impulse will be transmitted over line 68 as brush 38 passes over segment 78 instead of as it passes over segment 77. At the receiving station brush 85 will be passing over segment 91 and cause the operation of relays 253 and 254 over lead 262. The operation of these relays will cause distributor 250 to transmit the associated code combination to station 27 instead of to station 26.

During the transmission of the code combination from station 11, brush arm 221 of distributor 220 makes one revolution. During the time brush 222 passes over segment 228 a circuit is completed for releasing relays 137 and 138 from ground through segment 227, brush 222, segment 228, lead 232, outer left-hand break contact of relay 336 to the right-hand winding terminal of relay 138. Relays 137 and 138 release during this time because ground is connected to both of their winding terminals.

As brush arm 221 continues to rotate during the transmission of the code combination from station 11 brush 222 passes over segment 224 and completes a circuit for the operation of relays 237 and 238 from ground through segment 227, brush 222, segment 224, lead 243, left-hand outer make contacts of relay 134 to battery through the windings of relays 237 and 238 and resistance 244.

Brush 222 will then pass over start segment 225. When brush 222 starts to pass over segment 225 it completes a circuit for the operation of relay 139 from battery through segment 226, brush 222, segment 225 of distributor 220, lead 217, operated inner left-hand contacts of relay 236, inner left-hand break contacts of relay 336, right-hand outer make contacts of relay 134, winding of relay 139, break contacts of relay 138 to ground over lead 118 through the right-hand contacts of relay 115. Relay 139 in operating completes a locking circuit from battery through its own make contacts, as described above. Relay 139 in operating prepares a circuit for the operation of start relay 114. Relay 139 also prepares a circuit for the operation of relay 140, as described above.

During the next revolution of rotation of the brush arm 36 of the sending distributor 33 start relay 114 will be operated and cause a code combination to be transmitted by transmitting apparatus 101 at subscriber's station 10. During succeeding revolutions of the transmitting distributor brush arm 36 the above cycle of operations will be repeated; first, a code combination of impulses being transmitted from station 10, then a code combination of impulses from station 11, then a code combination of impulses from station 10, etc., so long as both stations wish to simultaneously transmit to their corresponding stations 26 and 27.

The operation of the system when more than two subscribers at local stations desire to simultaneously transmit messages to their corresponding stations is similar to that described above for two stations. During the first revolution of the brush arm 36 of the main synchronizing transmitting distributor 33 a code combination of impulses is transmitted from station 10. During the next rotation of the brush arm 36 a code combination of impulses is transmitted from the next active or energized station which desires to transmit message currents. During the next rotation of brush arm 36 a code combination of impulses will be transmitted from the next energized or active station, and so on. After a code combination of impulses has been transmitted from each energized station, a second code combination will be transmitted from the first station, then from the second station, and so on, until a second code combination has been transmitted from each of the active stations. Then a third code combination of impulses will be transmitted from each of the stations, and so on.

In each case the code combination of intelligence conveying impulses as transmitted over the main line is associated with selecting or directing impulses which cause the code combination of impulses to be transmitted to the proper local station connected to the second main station.

In case two or more of the subscribers simultaneously operate their appropriate keys and switches to energize their stations so that any two relays 115, 215 or 315 are operated simultaneously over leads 133, 233 and 333 under control of the main transmitting distributor, it is necessary to provide some time delay either for these relays or for the relays that operate from their contacts. As shown in Fig. 5, an inductance and retard coil 264 is connected in series with the windings of relays 234 and 236 for causing these relays to be slower in operating than relays 134 and 136. A similar retard coil 364 is connected in series with the windings of relays 334 and 336 and is of such a value that these relays are slower in responding to the operation of relay 315 than are relays 234 and 236. It is necessary to make these relays slow in operating to provide sufficient time for the relays 137 and 138 of the preceding group of relays or relays 237 and 238 to be operated and released before their locking circuit is completed through either the contacts of relays 236 or 336, respectively.

When any one of the subscribers completes the message or when the supply of perforated tape becomes exhausted switches at the local stations are operated which deenergize the stations or at least render the lines inactive so that the main line will no longer be assigned or connected to that station for transmission of impulses therefrom to the associated station.

Thus, if only one station is transmitting the full line time is assigned to that station and if that station can transmit at sixty words per minute and the main line also transmits at a maximum of sixty words per minute then the equipment at the subscriber's station will operate at its full capacity and transmit sixty words per minute to the associated station. If, however, two stations wish to simultaneously transmit to their associated stations the main line circuit will still operate at its capacity of sixty words per minute; however, each of the local stations will be operated at the rate of thirty words per minute. Similarly, if all three of the local subscribers' stations to simultaneously transmit their transmitting equipment will be operated at a speed of twenty words per minute.

What is claimed is:

1. In a telegraph system, a main station, a main telegraph channel connected to said station, a synchronous distributor at said main station connected to said channel, a plurality of local stations associated with said main station, a local telegraph line connecting said main station to each of said associated local stations, means at each of said local stations for transmitting and receiving telegraph signaling impulses, supervisory signaling means at each of said local stations, allotting circuit means comprising only relays at said main station under control of said supervisory means at the local stations for connecting said local stations to said telegraph channel in rotation in response to supervisory signals transmitted from said local stations.

2. In a telegraph system, a first main station, a second main station, a main telegraph channel extending between said stations, a plurality of extension stations associated with each of said main stations, extension lines connected between said extension stations and the associated main station, start-stop transmitting and receiving apparatus located at said extension stations and at the associated main station connected to said extension lines, apparatus at said first main station for storing the intelligence impulses of the signals received from the extension stations, means for adding to said intelligence impulses impulses indicating the station at which said intelligence impulses originated, and means for transmitting said intelligence and added indicating impulses over said main line, apparatus at said second main station responsive to said added impulses for directing the intelligence impulses to one of its associated extension stations, and means for adding to said intelligence impulses start and stop impulses for properly controlling the apparatus at said extension station.

3. Method of operating a telegraph system comprising a main line and a plurality of extension lines connected thereto, which comprises transmitting start-stop telegraph signal impulses over said extension lines, suppressing the start and stop impulses associated wtih each code combination of intelligence impulses, associating directive impulses with each code combination of intelligence impulses and transmitting said combination of directive impulses and intelligence code combinations of impulses over said main line and suppressing said directive impulses and supplying proper start and stop impulses for each code combination of intelligence impulse and transmitting said start and intelligence and stop impulses over the extension lines.

4. In a telegraph system, providing direct channels between a plurality of pairs of telegraph stations, a concentrating system comprising a first main station, a second main station, a main line extending between said stations, synchronous telegraph apparatus connected to each end of said line, local lines extending from said main stations to said other telegraph stations, start-stop telegraph apparatus connected to the ends of said local telegraph lines, allotting apparatus connected between said synchronous and start-stop apparatus at said main stations, interconnecting means between said start-stop distributors and said allotting apparatus for allotting the succeeding energized start-stop line during the transmission of a code combination of impulses over another one of said local lines, means at said main stations for storing the intelligence impulses of each code combination received from said local lines, means for adding to said intelligence impulses an impulse designating the particular line from which said intelligence impulses were received, means for transmitting said stored and added impulses over said main line, telegraph apparatus responsive to said added impulse for directing said intelligence impulses to the other station of the pair of stations including the transmitting station.

5. In a telegraph system, a main line, concentrating apparatus connected to each end of said line, a plurality of telegraph extension lines connected to said concentrating apparatus, start-stop transmitting and receiving apparatus connected to the ends of said extension lines, circuits connecting said start-stop apparatus and said apparatus connected to the main line including apparatus for suppressing the start and stop impulses and apparatus for adding a directing permutation code group of impulses to each code combination of intelligence conveying impulses transmitted over said main line.

6. A telegraph system comprising a main line, a plurality of extension lines connected to the ends of said main line, means for transmitting code combinations of intelligence conveying impulses over said extension lines, means for adding directing impulses to each of said code combinations and apparatus for transmitting all of said impulses over said main line.

7. A telegraph system comprising a main line, a plurality of extension lines connected to the ends of said main line, means for transmitting a start and a stop impulse in combination with each code combination of intelligence conveying impulses over said extension lines, and means for transmitting other impulses in combination with each code combination of said intelligence conveying impulses over said main line.

8. A telegraph system comprising a main line, a plurality of extension lines associated with each end of said main line, means for transmitting a start and a stop impulse in combination with each code combination of intelligence conveying impulses over said extension lines, means connected between one end of said main line and the extension lines associated therewith for substituting directing impulses for said start and stop impulses, and means connected between the other end of said main line and the extension lines associated therewith for substituting start and stop impulses for said directing impulses.

9. A telegraph system comprising a main line, a plurality of extension lines cooperating with each end of said main line, switching apparatus comprising only relays and circuits therefor connected between said extension lines and the ends of said main line, and means for adding switching impulses to each code combination transmitted over said main line for controlling switching apparatus at the opposite end of said main line and directing the course of said code combination.

10. In a telegraph system, a main line, concentrating apparatus connected to each end of said main line, a plurality of telegraph extension lines connected to the concentrating apparatus at each end of said main line, start-stop transmitting and receiving apparatus connected to said extension lines, means for conditioning said transmitting apparatus for transmitting over said extension lines, and means comprising only relays and circuits therefor for connecting any of said extension lines to said main line in rotation in response to the conditioning of any of said transmitting means.

HAROLD J. CUNNINGHAM.
LLOYD RICHMOND DOUGLASS.
JAMES ARCHIBALD DUNCAN.
CHARLES ROBERT WALKER.